(12) United States Patent
Ahmed

(10) Patent No.: US 10,059,395 B2
(45) Date of Patent: Aug. 28, 2018

(54) BICYCLE TRAINING WHEEL ASSEMBLY

(71) Applicant: Aslam Ahmed, Mississauga (CA)

(72) Inventor: Aslam Ahmed, Mississauga (CA)

( * ) Notice: Subject to any disclaimer, the term of this patent is extended or adjusted under 35 U.S.C. 154(b) by 0 days.

(21) Appl. No.: 15/193,041

(22) Filed: Jun. 25, 2016

(65) Prior Publication Data

US 2017/0369113 A1  Dec. 28, 2017

(51) Int. Cl.
*B62H 1/12* (2006.01)
*B60B 19/14* (2006.01)
*B62H 7/00* (2006.01)

(52) U.S. Cl.
CPC .............. *B62H 1/12* (2013.01); *B60B 19/14* (2013.01); *B62H 7/00* (2013.01); *B60B 2360/324* (2013.01); *B60B 2360/50* (2013.01); *B60B 2900/313* (2013.01); *H05K 999/99* (2013.01)

(58) Field of Classification Search
CPC .................................. B62H 1/12; B60B 19/14
See application file for complete search history.

(56) References Cited

U.S. PATENT DOCUMENTS

| | | | | |
|---|---|---|---|---|
| 3,214,785 A * | 11/1965 | Chroust | ................... | B60B 19/14 16/18 R |
| 3,642,305 A * | 2/1972 | Pawsat | ..................... | B62H 1/12 248/230.1 |
| 3,827,369 A * | 8/1974 | Mueller | ................... | B60B 19/14 104/118 |
| 3,877,727 A * | 4/1975 | Johannsen | ............... | B62H 1/12 280/301 |
| 4,058,344 A * | 11/1977 | Dyson | ..................... | B60B 19/14 301/7 |
| 4,174,871 A * | 11/1979 | Brannan | ................. | F16O 33/20 301/7 |
| 4,203,500 A * | 5/1980 | Kamiya | .................... | B62H 1/12 180/219 |
| 4,615,535 A * | 10/1986 | McMurtrey | .............. | B62H 1/12 280/293 |
| 4,810,000 A * | 3/1989 | Saunders | ................. | B62H 1/12 280/293 |
| 5,064,213 A * | 11/1991 | Storch | ...................... | B62H 1/12 280/293 |
| 5,100,163 A * | 3/1992 | Egley | ....................... | B62H 1/12 280/293 |
| 5,352,403 A * | 10/1994 | Egley | ....................... | B62H 1/12 280/293 |
| 5,492,354 A * | 2/1996 | Rainey | ..................... | B62H 1/12 267/286 |
| 6,331,012 B1 * | 12/2001 | Eisenmann, II | ......... | B62H 1/12 280/293 |
| 6,705,632 B2 * | 3/2004 | Yoshida | ................... | B62H 1/12 280/288.4 |

(Continued)

*Primary Examiner* — Jacob D Knutson
*Assistant Examiner* — Michael R Stabley

(57) ABSTRACT

The present invention relates to a bicycle training wheel assembly that uses uniquely, spherical wheel made of rubber or polyurethane substances of optimal consistency for this utility, as opposed to using the conventional cylindrical wheel. The foregoing properties of the said spherical wheel provide bounce and shock absorption. This invention allows the rider to obtain better balance and stability while learning to ride the bicycle. The assembly attaches to both sides of the rear wheel axle of the bicycle.

1 Claim, 4 Drawing Sheets

(56) References Cited

U.S. PATENT DOCUMENTS

| | | | |
|---|---|---|---|
| 6,709,000 B1* | 3/2004 | Blake | B62H 1/12 280/293 |
| 7,032,916 B2* | 4/2006 | Plana | B62H 1/12 280/288.4 |
| 7,641,213 B1* | 1/2010 | Chen | B62H 1/12 280/293 |
| 8,944,453 B1* | 2/2015 | Robertson | B62H 1/12 280/293 |
| 2013/0078028 A1* | 3/2013 | Chen | B62H 1/12 403/145 |
| 2015/0113765 A1* | 4/2015 | Perry | A61G 5/10 16/28 |
| 2015/0123388 A1* | 5/2015 | Di Vitto | B62H 1/12 280/755 |

* cited by examiner

BICYCLE TRAINING WHEEL ASSEMBLY

BACKGROUND OF THE INVENTION

1. Field of Invention

The present invention is the subject of bicycle training wheel assembly that elates particularly to the use of spherical wheel in the assembly.

2. Prior Art

Training wheel assembly that are presently available in the market typically comprise conventional cylindrical wheels and rigid brackets affixed to the bicycle rear wheel axle. This type of assembly does not provide the rider adequate relief from imbalance or provide adequate protection from a fall in an unstable situation when the rider is riding over uneven surface or, when she is turning the bicycle. This deficiency is largely due to the rigid construction of the conventional cylindrical wheel based bicycle training wheels, and makes for a difficult learning process for the rider.

A number of patents for bicycle training wheel assembly have been registered with United States Patent and Trademark Office, showing various designs that attempt to address this problem. These patents are classified under patent classification B62H and some of these are referenced by the following US patent numbers:

U.S. Pat. No. 6,318,745, U.S. Pat. No. 6,331,012, U.S. Pat. No. 7,226,067, U.S. Pat. No. 7,641,213, U.S. Pat. No. 7,712,759 B2, U.S. Pat. No. 8,944,453. The above patents do not show that spherical wheel is used in the bicycle training wheel assembly. The author is not aware of any other prior art that have shown to use spherical wheel in the construction of bicycle training wheel assembly.

The present invention described below is an improvement over prior art and it also provides other related advantages.

SUMMARY OF THE INVENTION

The present invention relates to a bicycle training wheel assembly that uses uniquely, spherical wheel made of rubber or polyurethane substances of optimal consistency for this utility, as opposed to using the conventional cylindrical wheel. The foregoing properties of the said spherical wheel provide bounce and shock absorption. This invention allows the rider to obtain better balance and stability while learning to ride the bicycle. The assembly attaches to both sides of the bicycle rear wheel axle.

The primary objective of the said invention is to enable the rider to lean to ride a bicycle easily in the following ways:

When the rider is learning to ride the bicycle and the bicycle tilts to one side, the spherical wheel of the assembly is engaged against the ground. On engagement, the centrifugal contact so made provides a small bounce to help balance the bicycle to the centre. The natural inertial inclination of the rider is to exert a pull to the other side of the bicycle, resulting in another small bounce. This act teaches the rider of her natural inclination to seek balance.

A further objective of the present invention is to provide a training wheel assembly, whereby the spherical wheel provides a cushion in case the bicycle tilts significantly to one side. When greater pressure is exerted on the spherical wheel that results from excessive tilt, the spherical wheel with its properties of shock absorption, and its inherent properties of central equilibrium restrains the bicycle from toppling over and thus provides relief to the learner from possible injury. In this manner, the rider obtains reassurance and gains greater confidence in her ability to understand the balancing nature of the bicycle. The rider's learning curve is thus expected to be reduced.

The secondary objective of the said training wheel assembly, once the primary function is fulfilled is when the training wheel assembly is detached from the rear bicycle wheel and disassembled. Upon disassembly, components of the training wheel assembly are reconstituted to create hooks and hangers for small objects and tools. This is in keeping with the desire to reduce waste after the initial objective is satisfied.

Advantages of the present invention am the following:

The assembly construction is simple and easy to assemble, install, adjust and use. These will be observed from the description of the drawings.

The possibility of injury to the rider is reduced by the protection afforded by the said properties of the spherical wheel, in instances of instability caused by riding over uneven surfaces or while taking a turn.

BRIEF DESCRIPTION OF SEVERAL VIEWS OF THE DRAWINGS

The following drawings form part of the specification and are to be construed in conjunction therewith.

DETAILED DESCRIPTION OF THE INVENTION

The present invention relates to a bicycle training wheel assembly that uses uniquely, spherical wheel made of rubber or polyurethane substances of optimal consistency for this utility, as opposed to using the conventional cylindrical wheel. The foregoing properties of the said spherical wheel provide bounce and shock absorption. This invention allows the rider to obtain better balance and stability while learning to ride the bicycle. The assembly attaches to both sides of the bicycle rear wheel axle.

The primary objective of the said invention is to enable the rider to learn to ride a bicycle easily in the following ways:

When the rider is learning to ride the bicycle and the bicycle tilts to one side, the spherical wheel of the assembly is engaged against the ground. On engagement, the centrifugal contact so made provides a small bounce to help balance the bicycle to the centre. The natural inertial inclination of the rider is to exert a pull to the other side of the bicycle, resulting in another small bounce. This act teaches the rider of her natural inclination to seek balance.

A further objective of the present invention is to provide a training wheel assembly, whereby the spherical wheel provides a cushion in case the bicycle tilts significantly to one side. When greater pressure is exerted on the spherical wheel that results from excessive tilt, the spherical wheel with its properties of shock absorption, and its inherent properties of central equilibrium, restrains the bicycle from toppling over and thus provides relief to the learner from possible injury. In this manner, the rider obtains reassurance and gains greater confidence in her ability to understand the balancing nature of the bicycle. The rider's learning curve is thus expected to be reduced.

The following narrative provides a description of the training wheel assembly process as shown by Drawings and included in this Specification. All major sections of the training wheel assembly are referred to as components and numbered 2 through 5. Other related items are referenced by part number. All these items are marked by arrows and referenced throughout in this narrative.

Figure 1:
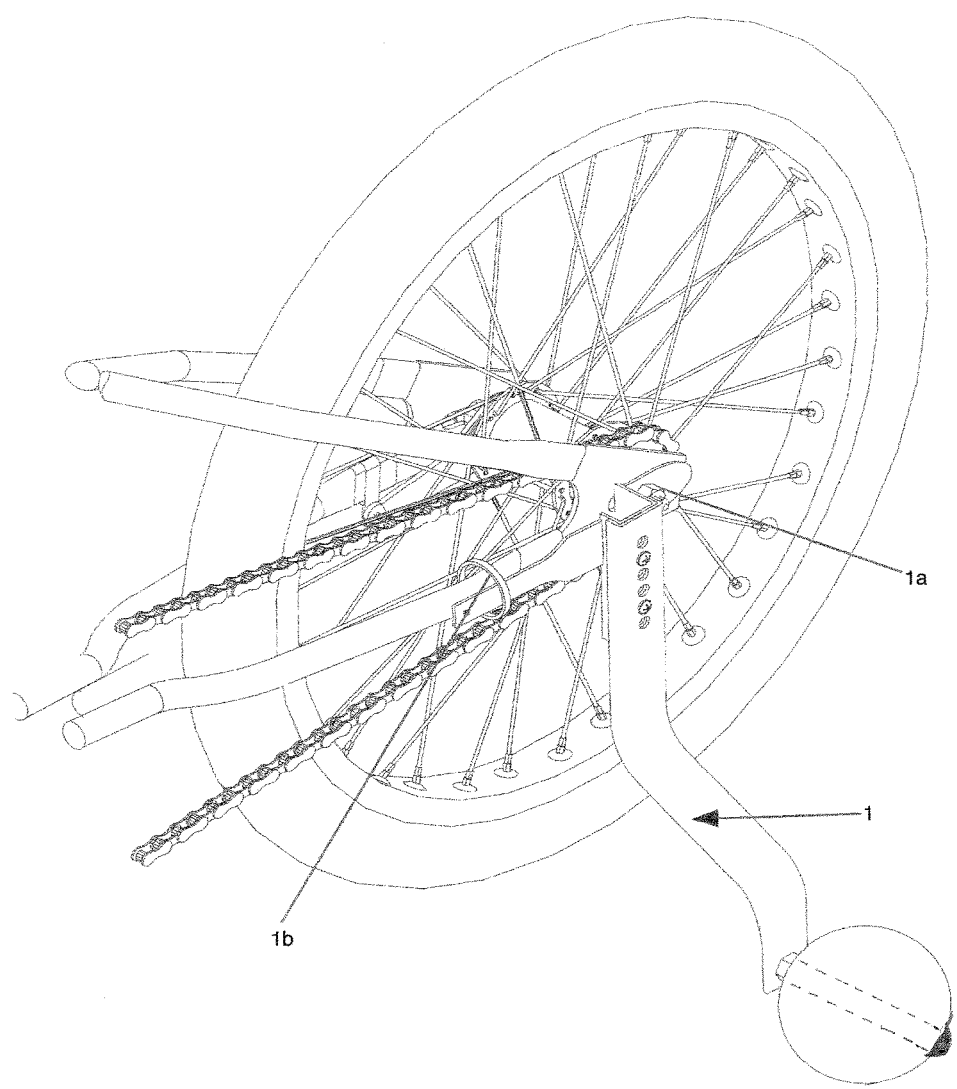
FIG. 1 is a side elevation view of the completed training wheel assembly attached to the bicycle rear wheel axle.

FIG. 1 is a side elevation view of the completed training wheel assembly (marked by arrow 1), that is affixed to the bicycle rear wheel axle by a threaded nut (part 1a) and fastened by a clamp (part 1b) to the left side fork of the bicycle for stability of the assembly.

Figure 2:
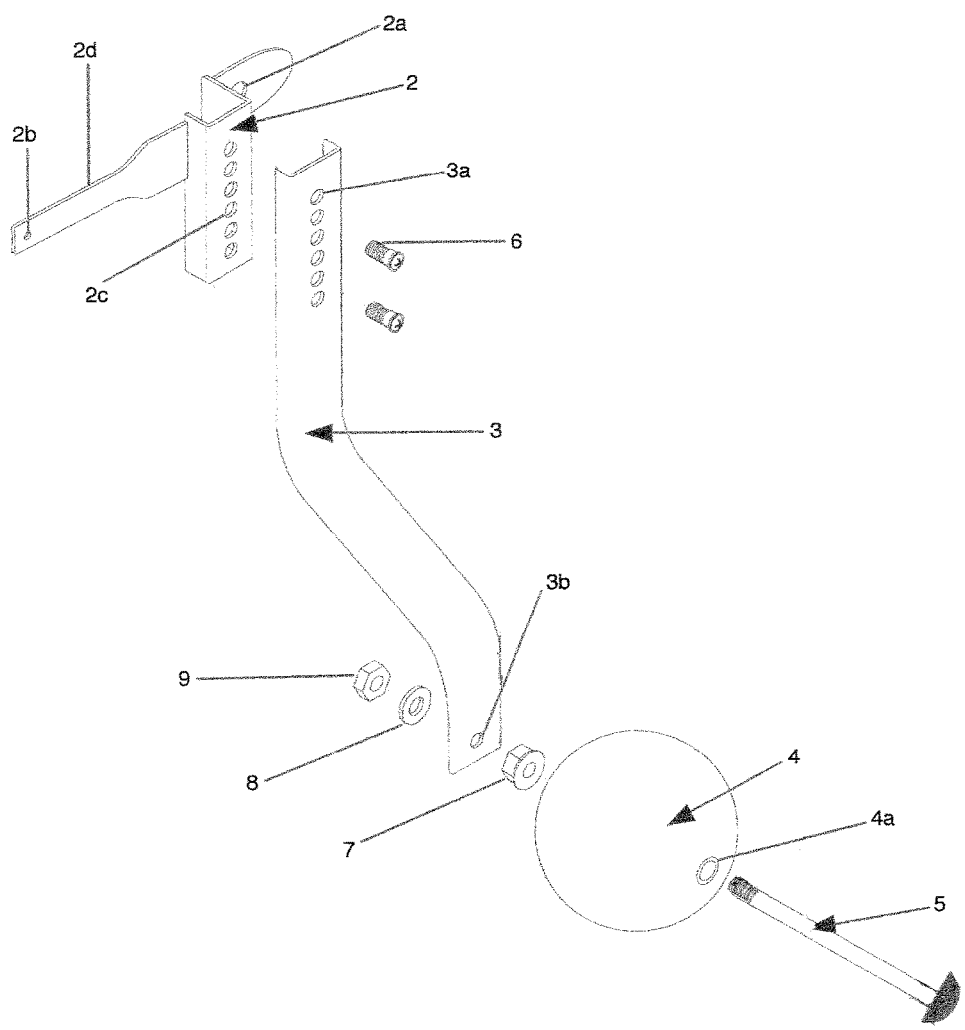
FIG. 2 is a perspective view of the training wheel linkage assembly, showing the manner in which all components are assembled together.

FIG. 2 is a perspective view of the training wheel linkage assembly, showing the manner in which all components are assembled together. These components are numbered 2 for bracket, 3 for arm, 4 for spherical wheel, and 5 for axle. These components of the assembly are identified by arrows.

The bracket (component 2) is an intermediary that is used to assemble the bicycle wheel axle to the arm (component 3), spherical wheel (component 4) and the axle (component 5) together. The bracket is made of steel and comprises parts 2a, 2b, 2c and 2d. Part 2a is a groove through which the bicycle rear wheel axle is fastened to the bracket by a threaded nut in (FIG. 1, part 1a).

Figure 4:
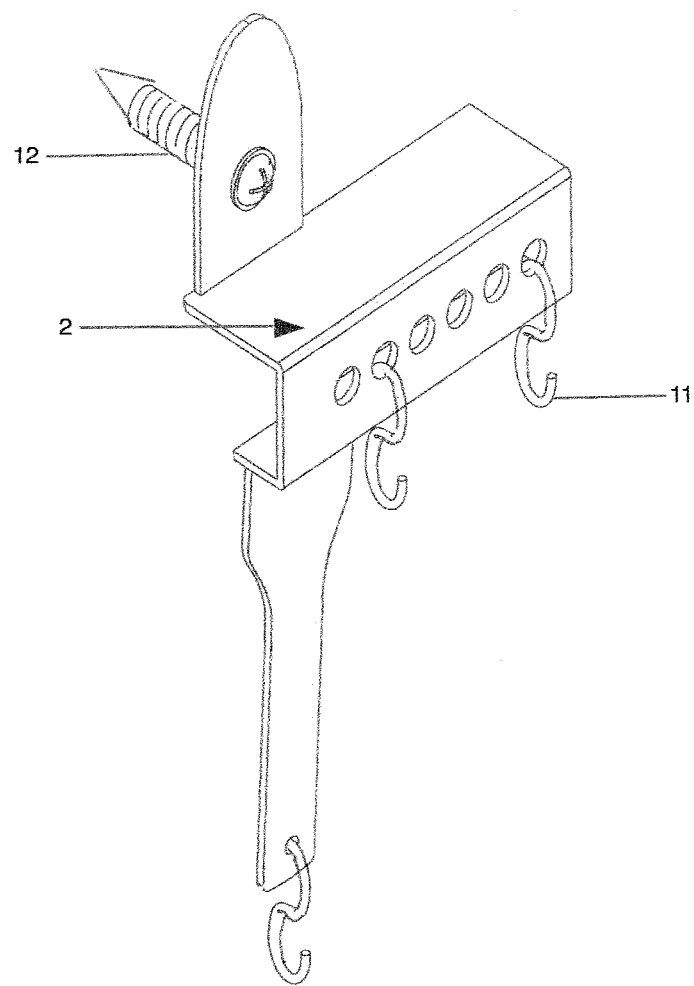
FIG. 4 is perspective view of the bracket in FIG. 2, reconstituted as a placeholder for hooks to hang small objects and tools.

Part 2b is a groove used to attach a hook for small objects and tools in the secondary use of the assembly components and is shown by FIG. 4. Part 2c is a representative view of several threaded grooves placed vertically in the middle part of the bracket. These grooves allow the arm (component 3) to be fastened to it by threaded screws (part 6) at varying height from the ground. Part 2d is an extension of the bracket and is affixed to the bicycle fork by a clamp (FIG. 1, part 1b) to provide stability to the training wheel assembly.

The arm (component 3) is made from C Channel section steel and comprises parts 3a and 3b. Part 3a is a representative view of several threaded grooves placed vertically at equal intervals, in the upper part of the arm. The arm slides snugly and effortlessly against the bracket at a desired, height from the ground at which point it is affixed by screws (part 6) to the bracket (component 2). C Channel section steel is used in this assembly to provide additional strength and support to the arm when affixed to the bracket. Part 3b is a groove through which the threaded end of the axle (component 5) is passed to be fastened by a spring washer (part 8) and threaded nut (part 9).

The spherical wheel (component 4) is composed of rubber or polyurethane substances of optimal consistency for this utility. The properties of the spherical wheel mentioned above also provide a cushion against fall in case the bicycle tilts significantly to one side. When greater pressure is exerted on the spherical wheel that results from excessive tilt, the spherical wheel with its properties of shock absorption, and its inherent properties of central equilibrium, restrains the bicycle from toppling over and thus provides relief to the learner from possible injury. A groove made through the diameter of the said wheel allows a tubing (part 4a) that is made of plastic or steel, to be inserted in the groove to facilitate the axle (component 5) to pass through the tubing.

The axle (component 5) is a metal object, threaded at one end. The threaded end of the axle is passed through the tubing (part 4a). A threaded nut (part 7) is affixed to the axle to hold the spherical wheel (component 4) in place, leaving only a small margin for mobility of the wheel. The remainder of the threaded end of the axle is now passed through the groove (part 3b) of the arm (component 3). The assembly is completed by affixing a spring washer (part 8) and a threaded nut (part 9) to the remaining part of the threading in the axle.

Figure 3:
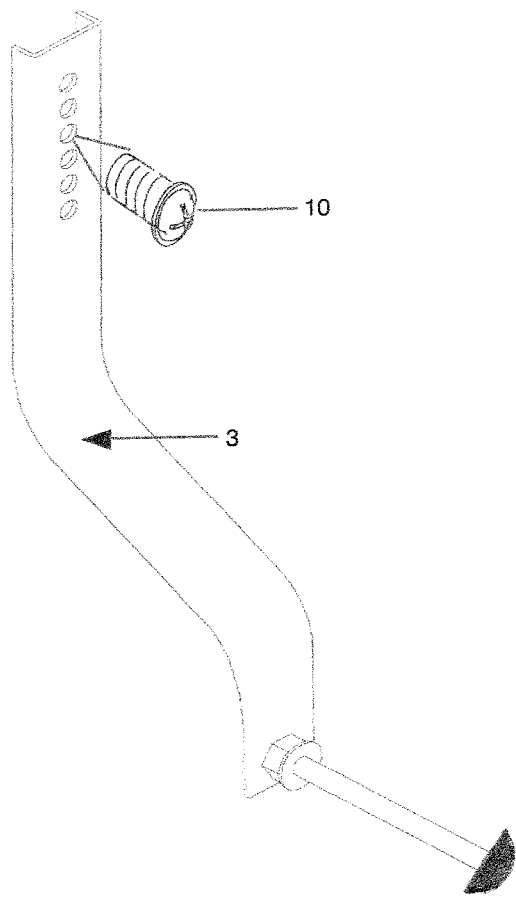
FIG. 3 is a perspective view of the assembly arm in FIG. 2, reconstituted as hanger for small objects.

Upon completion of the primary function of learning to ride the bicycle, the training wheel assembly (FIG. 1, arrow 1) can be detached from the rear bicycle wheel axle and disassembled. The disassembled components of the training wheel assembly can then be reconstituted to create hooks and hangers for small objects and tools. FIG. 3 is another view of the assembly arm in FIG. 2 (component 3), reconstitute as hanger for small objects. Only the spherical wheel (component 4) is detached from the arm. The arm is then reconstituted and affixed to a wall by wood screw (part 10). FIG. 4 is another view of the bracket in FIG. 2 (component 2), reconstituted to use part 2b and 2c of the component as a placeholder for hooks (part 11) to hang small objects and tools. The bracket is affixed to a wall by a wood screw (part 12).

I claim:

1. A device to train children to ride a bicycle, consisting of two sets of the device, one for each side of the bicycle rear wheel, and each comprising:
    a. a bracket anchored to one side of the bicycle fork and fastened to one end of the bicycle rear wheel axle;
    b. a c-channel arm that slides to and fastened at a desired height on the bracket;
    c. an axle affixed to the lower end of the c-channel arm; and
    d. a spongy spherical wheel enclosing the axle.

* * * * *